(12) United States Patent
Jiang et al.

(10) Patent No.: US 10,248,769 B1
(45) Date of Patent: Apr. 2, 2019

(54) SYSTEMS AND METHODS FOR AUTHENTICATING USERS ON TOUCHSCREEN DEVICES

(71) Applicant: Symantec Corporation, Mountain View, CA (US)

(72) Inventors: Kevin Jiang, San Mateo, CA (US); Ilya Sokolov, Boston, MA (US)

(73) Assignee: Symantec Corporation, Mountain View, CA (US)

(*) Notice: Subject to any disclaimer, the term of this patent is extended or adjusted under 35 U.S.C. 154(b) by 247 days.

(21) Appl. No.: 15/233,876

(22) Filed: Aug. 10, 2016

(51) Int. Cl.
| | |
|---|---|
| *G06F 21/31* | (2013.01) |
| *G06F 21/83* | (2013.01) |
| *H04W 12/06* | (2009.01) |
| *G06F 3/041* | (2006.01) |
| *G06F 21/32* | (2013.01) |

(52) U.S. Cl.
CPC .............. *G06F 21/31* (2013.01); *G06F 3/041* (2013.01); *G06F 21/32* (2013.01); *G06F 21/83* (2013.01)

(58) Field of Classification Search
CPC .......... G06F 21/31; G06F 21/32; G06F 3/041; G06F 21/83
See application file for complete search history.

(56) References Cited

U.S. PATENT DOCUMENTS

| | | | | |
|---|---|---|---|---|
| 2009/0303204 | A1* | 12/2009 | Nasiri | A63F 13/06 345/184 |
| 2016/0048668 | A1* | 2/2016 | Zafiris | G06F 21/32 726/19 |
| 2017/0213017 | A1* | 7/2017 | Jung | G06F 21/31 |

\* cited by examiner

*Primary Examiner* — Noura Zoubair
(74) *Attorney, Agent, or Firm* — FisherBroyles, LLP

(57) ABSTRACT

The disclosed computer-implemented method for authenticating users on touchscreen devices may include (i) detecting that the computing device is at an authentication step that requires valid authentication input from a user in order to authenticate the user to a service on the computing device, (ii) detecting that the computing device is physically oriented such that a touchscreen of the computing device is facing away from the user of the computing device, (iii) receiving input from the user via the touchscreen, (iv) determining that the input from the user comprises a mirrored version of the valid authentication input that is flipped along a vertical axis relative to the touchscreen, and (v) authenticating the user to the service in response to determining that the input comprises the mirrored version of the valid authentication input. Various other methods, systems, and computer-readable media are also disclosed.

20 Claims, 7 Drawing Sheets

Normal version

Mirrored version

SYSTEMS AND METHODS FOR AUTHENTICATING USERS ON TOUCHSCREEN DEVICES

BACKGROUND

Many people carry mobile devices such as smartphones and tablets and interact with these devices frequently. Security-conscious users often lock their device with a passcode that must be entered before the device can be used. When entering device unlock codes in public spaces, such as on public transportation or in a crowd, it is not difficult for a bystander to observe a user's passcode. There is a similar problem when people enter passcodes at an automated teller machine (ATM). Usually, a user at an ATM will enter the passcode with one hand and use the other hand to block line of sight to the keypad, preventing bystanders from learning the user's passcode. However, this method is awkward with a mobile device, where typically a user will need to hold the device with one hand, especially when a user is in public and has nowhere to put the device down.

With traditional systems for authentication, users have limited options. A user may put their phone inside a bag or a backpack to reduce visibility to bystanders, but this method reduces visibility for the user, as well as being inconvenient and potentially drawing unwanted attention from bystanders. A user may also choose to wait to authenticate to their device until there are no bystanders, but this may be impractical for many situations. Accordingly, the instant disclosure identifies and addresses a need for additional and improved systems and methods for authenticating users on touchscreen devices.

SUMMARY

As will be described in greater detail below, the instant disclosure describes various systems and methods for authenticating users on touchscreen devices by detecting when a device has been turned so that the touchscreen faces down and accepting a mirrored version of the usual passcode in such situations.

In one example, a computer-implemented method for authenticating users on touchscreen devices may include (i) detecting that the computing device is at an authentication step that requires valid authentication input from a user in order to authenticate the user to a service on the computing device, (ii) detecting that the computing device is physically oriented such that a touchscreen of the computing device is facing away from the user of the computing device, (iii) receiving input from the user via the touchscreen, (iv) determining that the input from the user includes a mirrored version of the valid authentication input that is flipped along a vertical axis relative to the touchscreen, and (v) authenticating the user to the service in response to determining that the input includes the mirrored version of the valid authentication input.

In some examples, authenticating the user to the service on the computing device may include unlocking the computing device. In some embodiments, determining that the input may be a mirrored version of the valid authentication input may include determining that the valid authentication input includes a group of ordered components and determining, for each ordered component within the ordered components, that the currently entered component of the input from the user is a mirrored version of the ordered component that corresponds to the correct position in the ordered components.

In some embodiments, receiving the input from the user via the touchscreen may include detecting that the user has entered a component of the input and providing the user with an acknowledgement that the component of the input has been received by the computing device. In some examples, providing the user with the acknowledgement may include vibrating the computing device.

In some examples, detecting that the computing device is at the authentication step may include receiving input from the user that triggers the authentication step. In one embodiment, detecting that the computing device is physically oriented such that the touchscreen of the computing device is facing away from the user of the computing device may include using an accelerometer within the computing device to determine the physical orientation of the computing device.

In some embodiments, the computing device may include a mobile device. In one embodiment, the valid authentication input may include a series of shapes drawn on the touchscreen. Additionally or alternatively, the valid authentication input may include a series of presses at a series of points on the touchscreen.

In one embodiment, a system for implementing the above-described method may include (i) a detection module, stored in memory, that detects that the computing device is at an authentication step that requires valid authentication input from a user in order to authenticate the user to a service on the computing device and detects that the computing device is physically oriented such that a touchscreen of the computing device is facing away from the user of the computing device, (ii) a receiving module, stored in memory, that receives input from the user via the touchscreen, (iii) a determination module, stored in memory, that determines that the input from the user includes a mirrored version of the valid authentication input that is flipped along a vertical axis relative to the touchscreen, (iv) an authentication module, stored in memory, that authenticates the user to the service in response to determining that the input includes the mirrored version of the valid authentication input, and (v) at least one physical processor configured to execute the detection module, the receiving module, the determination module, and the authentication module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect that the computing device is at an authentication step that requires valid authentication input from a user in order to authenticate the user to a service on the computing device, (ii) detect that the computing device is physically oriented such that a touchscreen of the computing device is facing away from the user of the computing device, (iii) receive input from the user via the touchscreen, (iv) determine that the input from the user includes a mirrored version of the valid authentication input that is flipped along a vertical axis relative to the touchscreen, and (v) authenticate the user to the service in response to determining that the input includes the mirrored version of the valid authentication input.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
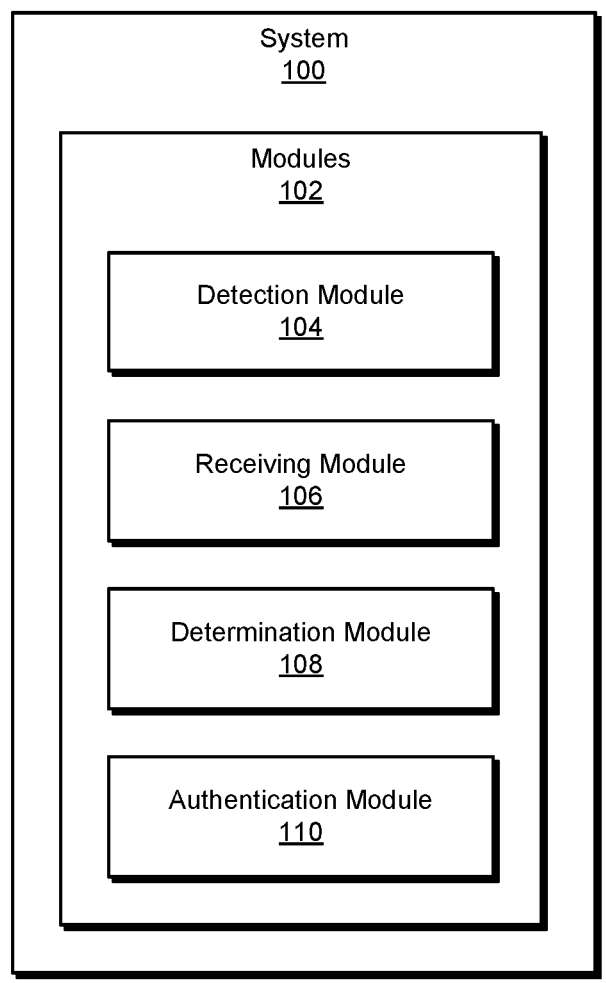
FIG. 1 is a block diagram of an example system for authenticating users on touchscreen devices.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for authenticating users on touchscreen devices. As will be explained in greater detail below, by accepting a mirrored version of a valid passcode as valid, the systems and methods described herein may enable users to log in to their mobile devices with the device face-down, preventing others from seeing the passcode, while still allowing users to enter their passcode in an intuitive manner.

Figure 2:
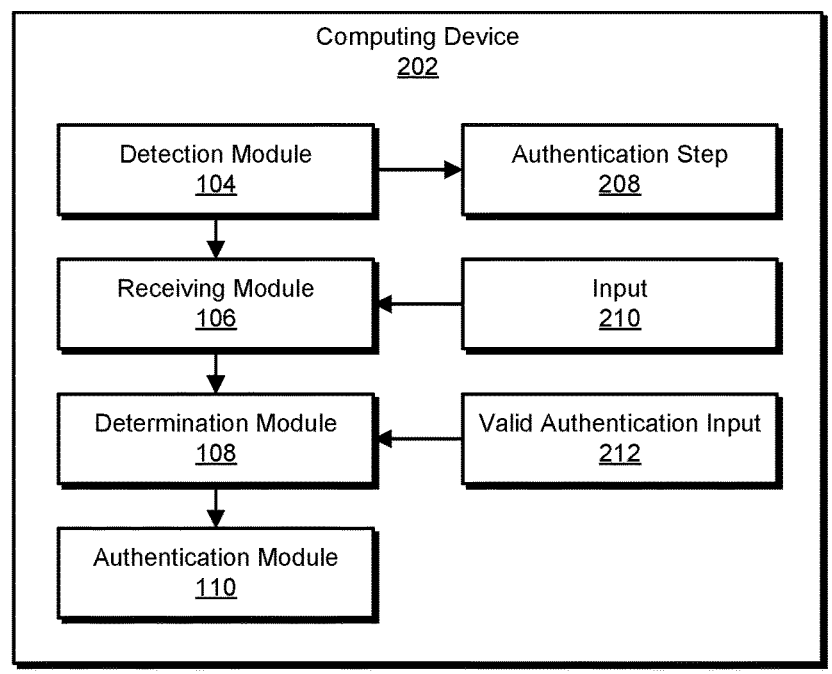
FIG. 2 is a block diagram of an additional example system for authenticating users on touchscreen devices.

The following will provide, with reference to FIGS. 1-2, detailed descriptions of example systems for authenticating users on touchscreen devices. Detailed descriptions of corresponding computer-implemented methods will also be provided in connection with FIG. 3. Detailed descriptions of an example touchscreen with authentication input will also be provided in connection with FIG. 4. Detailed descriptions of an example touchscreen numerical keypad will be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of example system 100 for authenticating users on touchscreen devices. As illustrated in this figure, example system 100 may include one or more modules 102 for performing one or more tasks. For example, and as will be explained in greater detail below, example system 100 may include a detection module 104 that detects that a computing device is at an authentication step that requires valid authentication input from a user in order to authenticate the user to a service on the computing device and that also detects that the computing device is physically oriented such that a touchscreen of the computing device is facing away from the user of the computing device. Example system 100 may additionally include a receiving module 106 that receives input from the user via the touchscreen. Example system 100 may also include a determination module 108 that determines that the input from the user includes a mirrored version of the valid authentication input that is flipped along a vertical axis relative to the touchscreen. Example system 100 may additionally include an authentication module 110 that authenticates the user to the service in response to determining that the input includes the mirrored version of the valid authentication input. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of example network architecture 700 in FIG. 7. One or more of modules 102 in FIG. 1 may also represent all or portions of one or more special-purpose computers configured to perform one or more tasks.

Example system 100 in FIG. 1 may be implemented in a variety of ways. For example, all or a portion of example system 100 may represent portions of example system 200 in FIG. 2. As shown in FIG. 2, system 200 may include a computing device 202. In one example, computing device 202 may be programmed with one or more of modules.

In one embodiment, one or more of modules 102 from FIG. 1 may, when executed by at least one processor of computing device 202, enable computing device 202 to authenticate users on touchscreen devices. For example, and as will be described in greater detail below, detection module 104 may detect that computing device 202 is at an authentication step 208 that requires valid authentication input 212 from a user in order to authenticate the user to a service on computing device 202. At the same time, detection module 104 may also detect that computing device 202 is physically oriented such that a touchscreen of computing device 202 is facing away from the user of computing device 202. Soon afterwards, receiving module 106 may receive input 210 from the user via the touchscreen. Next, determination module 108 may determine that input 210 from the user is a mirrored version of valid authentication input 212 that is flipped along a vertical axis relative to the touchscreen. Finally, authentication module 110 may authenticate the user to the service in response to determining that input 210 is a mirrored version of valid authentication input 212.

Computing device 202 generally represents any type or form of computing device capable of reading computer-executable instructions. In some embodiments, computing device 202 may be a smart phone such as an IPHONE or ANDROID device. Further examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, example computing system 610 in FIG. 6, or any other suitable computing device.

Figure 3:
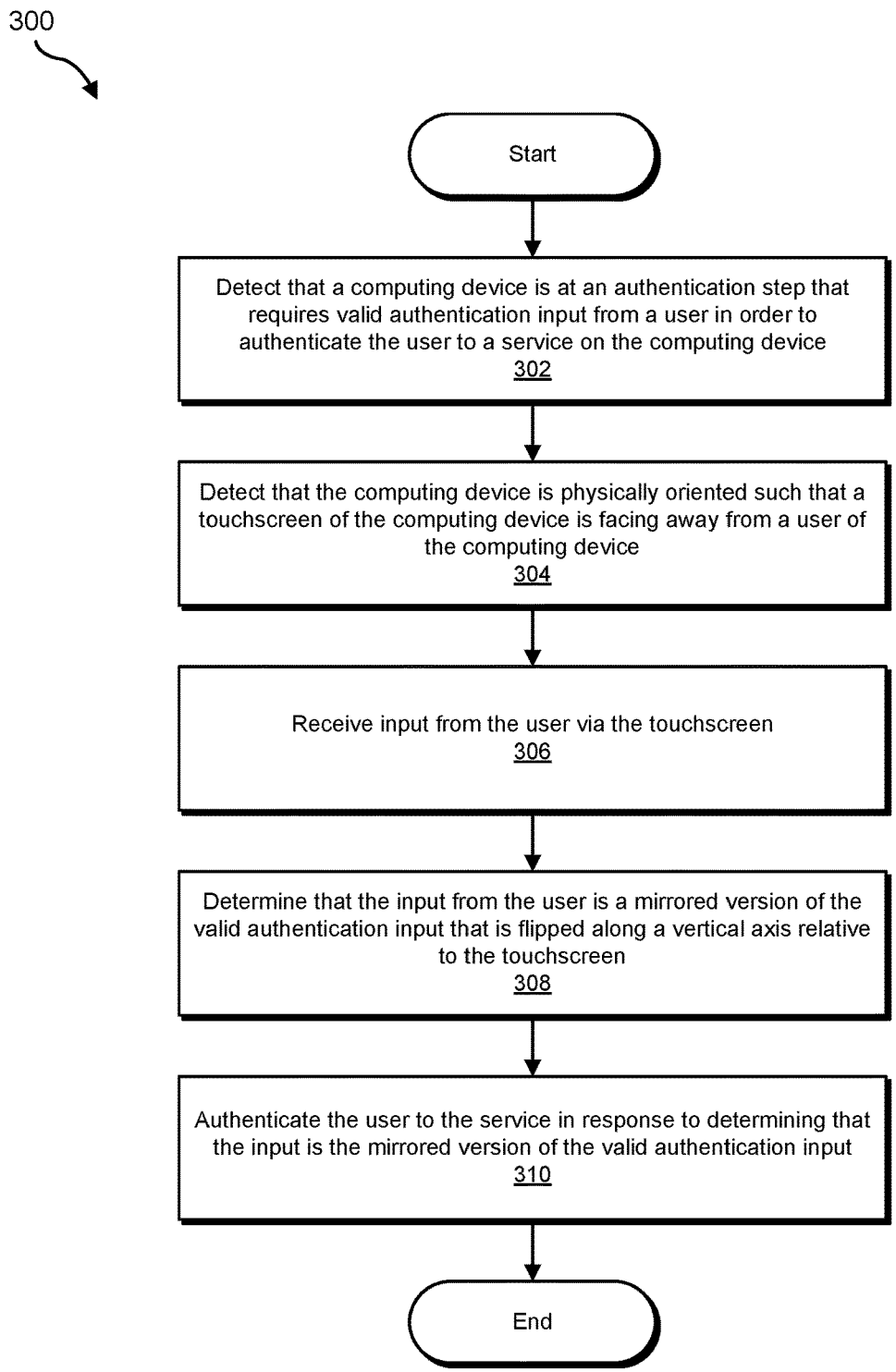
FIG. 3 is a flow diagram of an example method for authenticating users on touchscreen devices.

FIG. 3 is a flow diagram of an example computer-implemented method 300 for authenticating users on touchscreen devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of example network architecture 700 in FIG. 7.

As illustrated in FIG. 3, at step 302, one or more of the systems described herein may detect that a computing device is at an authentication step that requires valid authentication input from a user in order to authenticate the user to a service on the computing device. For example, detection module 104 may, as part of computing device 202 in FIG. 2, detect that computing device 202 is at an authentication step 208 that requires valid authentication input 212 from a user in order to authenticate the user to a service on computing device 202.

The term "authentication step," as used herein, generally refers to any situation where a user must authenticate before proceeding. For example, an authentication step may be a phone unlock screen that a user must authenticate to before performing further actions on the phone. In another example, an authentication step may be a login screen for an application and/or a website. In some examples, an authentication step may occur after a user has already authenticated to a service, such as when the user is changing important settings and/or performing important transactions. For example, a user who is attempting to change their password may be prompted with an authentication step to enter their old password before confirming the new password. In another example, a user who is transferring money via a website may be prompted to re-enter their password before confirming the transfer.

The term "valid authentication input," as used herein, generally refers to any input that may be provided by a user that authenticates the user to a service. In some examples, authentication input may include a password and/or passcode. In one embodiment, the valid authentication input may include a series of shapes drawn on the touchscreen. For example, the valid authentication input may be a squiggly line, a triangle in the upper left corner of the screen, and/or a square drawn in a certain order (e.g., starting at the lower left corner and proceeding clockwise). In another example, a series of shapes may be a series of letters, numbers and/or other characters that form a password. For example, if a user's pass phrase were "malicious toaster," the series of shapes would be "m," "a," "l," "i," "c," "i," and so forth. In some examples, a series of shapes may be a single shape. Additionally or alternatively, the valid authentication input may include a series of presses at a series of points on the touchscreen. For example, the valid authentication input may include pressing the upper right corner of the screen, the lower right corner of the screen, the upper left corner of the screen, and then the lower left corner of the screen, in that order. In another example, the series of presses may correspond to icons on the touchscreen. For example, a series of presses over icons representing the numbers "1," "2," "1," and "0" may be used to enter the numerical passcode "1210."

The term "service," as used herein, generally refers to any application, website, feature, and/or functionality that may be accessed on a computing device. In some examples, the service may be an authentication service for a mobile device and authenticating to the service may unlock the mobile device. In other examples, the service may be an app, a website, and/or a password-protected feature of the computing device.

Detection module 104 may detect that the computing device is at an authentication step in a variety of ways. In some examples, detection module 104 may detect that the computing device is at the authentication step by receiving input from the user that triggers the authentication step. For example, the user may press an unlock button on their mobile phone, triggering an authentication step.

At step 304, one or more of the systems described herein may detect that the computing device is physically oriented such that a touchscreen of the computing device is facing away from the user of the computing device. For example, detection module 104 may, as part of computing device 202 in FIG. 2, detect that computing device 202 is physically oriented such that a touchscreen of computing device 202 is facing away from the user of computing device 202.

The term "touchscreen," as used herein, generally refers to any portion of a device that allows a user to interact with the device by touching areas on a screen. In some embodiments, the touchscreen may be a touchscreen on a mobile device. The term "facing away from the user," as used herein, may generally refer to situations where the touchscreen of a device is positioned so that it is not directly visible to the current user of the computing device. For example, detection module 104 may detect that the touchscreen is facing away from the user if the touchscreen is rotated more than 90° away from the user along any axis. In some embodiments, the touchscreen may be facing away from the user because the touchscreen is facing downwards (e.g., parallel or nearly parallel with, and facing, the ground or floor). In one embodiment, detection module 104 may detect that a touchscreen is facing downwards if the touchscreen is within a predetermined angle of facing downwards. For example, if the computing device is within a 20° angle of being horizontal and the touchscreen angled is towards the floor, detection module 104 may detect that the touchscreen is facing downwards. In another embodiment, if the computing device is within a 60° angle of being horizontal and the touchscreen is on the downwards side, detection module 104 may detect that the touchscreen is facing downwards.

Detection module 104 may detect the orientation of the computing device in a variety of ways. In some embodiments, detection module 104 may use an accelerometer within the computing device to determine the physical orientation of the computing device.

At step 306, one or more of the systems described herein may receive input from the user via the touchscreen. For example, receiving module 106 may, as part of computing device 202 in FIG. 2, receive input 210 from the user via the touchscreen.

The term "input," as used herein, generally refers to any interaction between a user and a device via a touch screen. A user may enter input by pressing the touchscreen, swiping the touchscreen, drawing shapes on the touch screen, and/or using a tool such as a stylus to interact with the touchscreen. In some embodiments, input may be multitouch (i.e., created by a user pressing two or more points on the screen simultaneously).

Receiving module 106 may receive the input in a variety of contexts. For example, receiving module 106 may be part of an authentication system for the computing device that is expecting authentication input via the touchscreen. In another embodiment, receiving module 106 may be monitoring input to the touchscreen in order to mirror the input before passing the input on to a third-party service that is awaiting authentication information.

In some examples, receiving module 106 may detect that the user has entered a component of the input and provide the user with an acknowledgement that the component of the input has been received by the computing device. For example, if the input includes a password that has multiple letters that a user draws on the touchscreen, receiving module 106 may provide an acknowledgement to the user after every letter. In some examples, each time the user removes their finger and/or stylus from the touchscreen, receiving module 106 may provide an acknowledgement. In some embodiments, receiving module 106 may provide the acknowledgement whether the input is correct or not. In one embodiment, receiving module 106 may provide the user with the acknowledgement by vibrating the computing device. Additionally or alternatively, receiving module 106 may cause the computing device to make a noise, flash a light, and/or provide any other kind of feedback to the user.

At step 308, one or more of the systems described herein may determine that the input from the user may include a mirrored version of the valid authentication input that is flipped along a vertical axis relative to the touchscreen. For example, determination module 108 may, as part of computing device 202 in FIG. 2, determine that input 210 from the user may include a mirrored version of valid authentication input 212 that is flipped along a vertical axis relative to the touchscreen.

The term "mirrored version," as used herein, generally refers to a version of input that can be represented as a two-dimensional image and that is flipped over one axis. For example, the mirrored version of a touchscreen press in the upper-left corner of the screen is a touchscreen press in the upper-right corner of the screen. In another example the letter "d" is a mirrored version of the letter "b" that is flipped along the vertical axis while the letter "M" is a mirrored version of the letter "W" that is flipped along the horizontal axis. By contrast, the number "6" can be described as a version of the number "9" that is rotated, rather than mirrored, because the change occurs along two axes.

Figure 4:
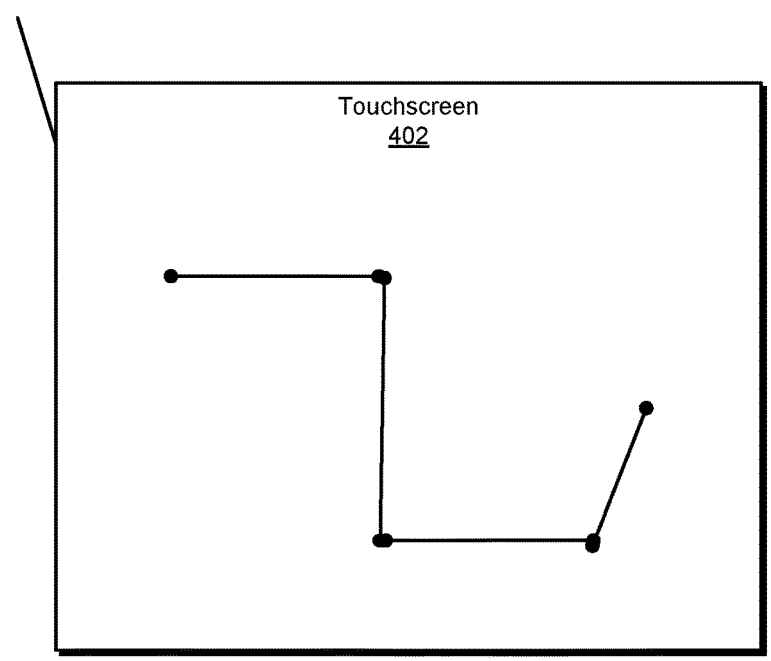
FIG. 4 is a block diagram of an example touchscreen with authentication input.
Figure 4:
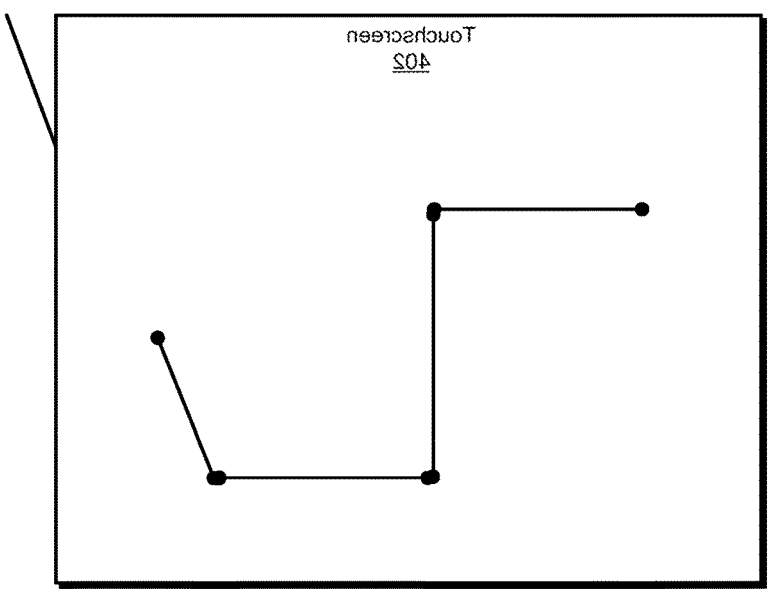
Figure 5:
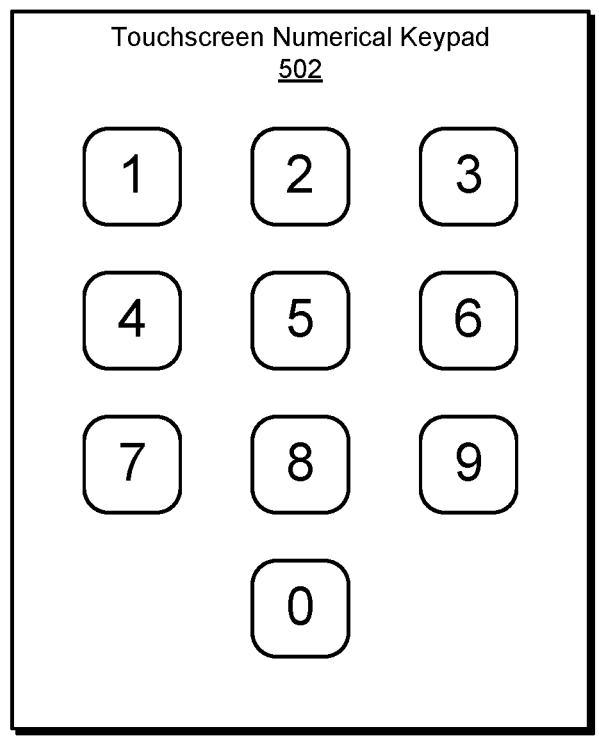
FIG. 5 is a block diagram of an example touchscreen numerical keypad.

In another example, as illustrated in FIG. 4, a user may use touchscreen 402 to input a shape composed of four lines. If the shape illustrated in the normal version of touchscreen 402 is a user's passcode for a mobile phone, then after flipping the mobile phone over the user may instinctively draw the shape starting from the top left, making a right angle and drawing a line downward, drawing another line to the right, and adding a tail going up and to the right, as they would if the phone were oriented normally. In this example, the resulting shape is the shape in the mirrored version of touchscreen 402, which, relative to the user (who is facing the back of the phone), is the same shape as the normal version, but, relative to the touchscreen that is receiving the input, is a horizontally mirrored version of the valid shape.

Determination module 108 may determine that the input is a mirrored version of the valid authentication input in a variety of ways. For example, determination module 108 may mirror the input and then compare the mirrored input to the valid authentication input. In some embodiments, determination module 108 may mirror several components of the input and then concatenate those components before comparing the concatenation to the valid authentication input. For example, determination module 108 may receive mirrored versions of the characters "p," "@," "s," "s," and "1," mirror the received versions to arrive at the actual characters, concatenate the characters to arrive at the password "p@ss1," and the compare a hash of the word "pass" to the stored hash of the user's password.

Additionally or alternatively, determination module 108 may determine that the input is a mirrored version of the valid authentication input by determining that the valid authentication input is a set of ordered components and determining, for each ordered component within the set of ordered components, that a currently entered component of the input from the user is a mirrored version of the ordered component that corresponds to the correct position in the set of ordered components. For example, if a user is attempting to input the number "1360" on a numerical keypad laid out the same way as touchscreen numerical keypad 502 illustrated in FIG. 5, the user may instead input the numbers "3," "1," "4," and "0," in that order. In this example, determination module 108 may determine that "3" is a mirrored version of "1," "1" is a mirrored version of "3," "4" is a mirrored version of "6," and "0" is a mirrored version if itself, and therefore the user's input is a mirrored version of the valid input of "1360."

In some embodiments, determination module 108 may determine that the input is a version of the valid authentication input that is being entered using a different input method than the valid authentication input. For example, if a user normally inputs a passcode via a keypad, a version of the valid input entered using a different input method may include the user drawing the characters of the passcode (in mirrored and/or normal versions) on the touchscreen with a finger and/or stylus.

Returning to FIG. 3, at step 310, one or more of the systems described herein may authenticate the user to the service in response to determining that the input may include the mirrored version of the valid authentication input. For example, authentication module 110 may, as part of computing device 202 in FIG. 2, authenticate the user to the service in response to determining that input 210 may include the mirrored version of valid authentication input 212.

Authentication module 110 may authenticate the user in a variety of contexts. For example, authentication module 110 may authenticate the user to the service on the computing device by unlocking the computing device. In another example, authentication module 110 may authenticate the user to an application and/or a website. Additionally or alternatively, authentication module 110 may open a password-protected file, change a password-protected setting, and/or authorize a password-protected transaction.

In some embodiments, the systems described herein may track a user's input patterns when attempting to authenticate to a face-down device. Because some users may naturally input mirrored versions of their authentication input while other users may not, the systems described herein may track whether a particular user's input is more likely to be mirrored or not and may improve efficiency by first checking mirrored versions of the user's input if the user is more prone to mirrored input and first checking normal versions of the user's input if the user is not prone to mirrored input.

As described in connection with method 300 above, the systems and methods described herein may enable users to intuitively and securely authenticate to their mobile devices in public places by detecting that the device has been flipped over and interpreting the input as a potentially mirrored version of the correct input. By enabling users to intuitively enter a mirrored version of their passcode on a facedown mobile device, the systems and methods described herein may help improve security for users' devices by preventing bystanders from seeing users' passcodes.

Figure 6:
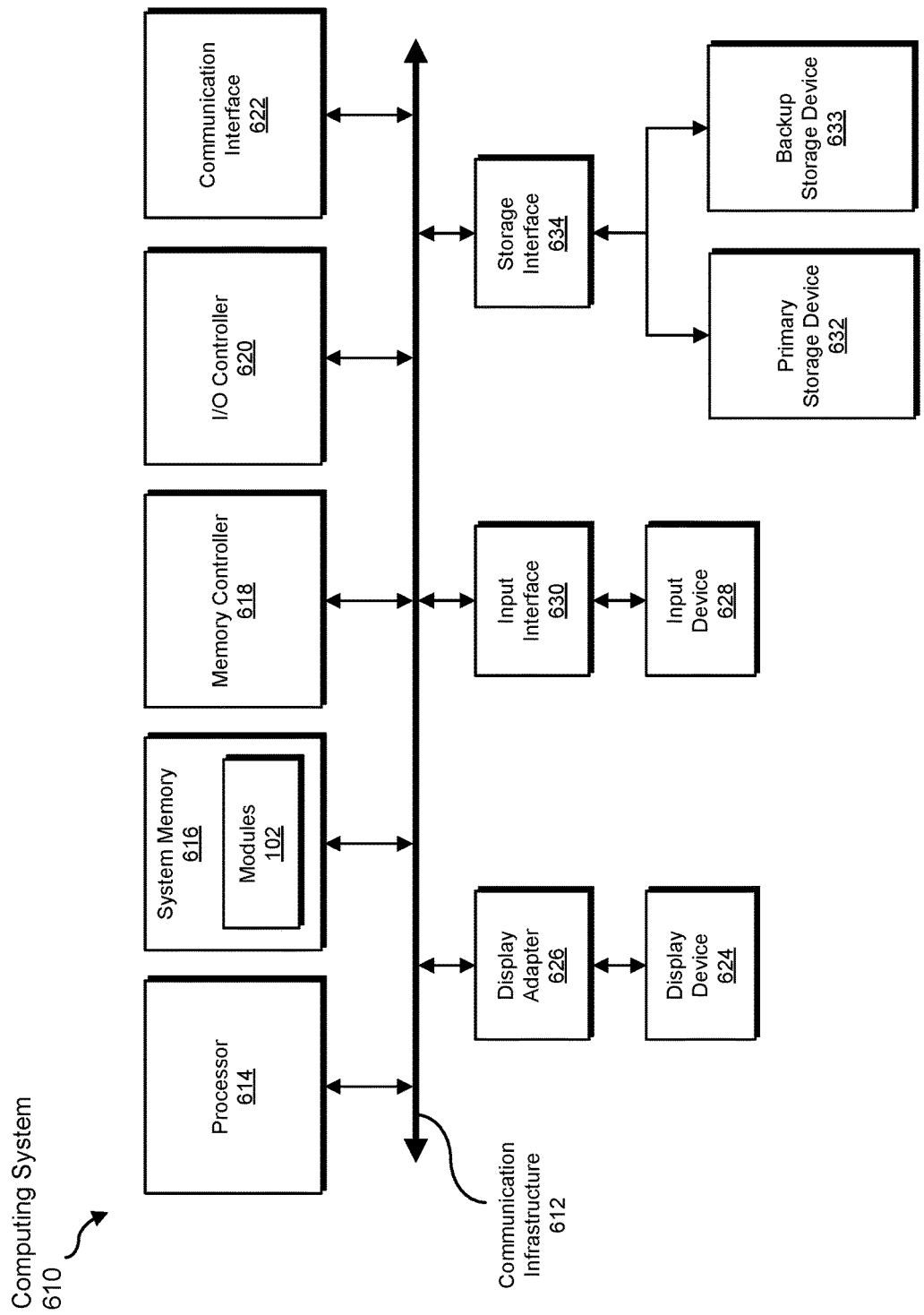
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to communication infrastructure 612 via an input interface 630. Input device 628 generally represents any type or form of input device capable of providing input, either computer or human generated, to example computing system 610. Examples of input device 628 include, without limitation, a keyboard, a pointing device, a speech recognition device, or any other input device.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
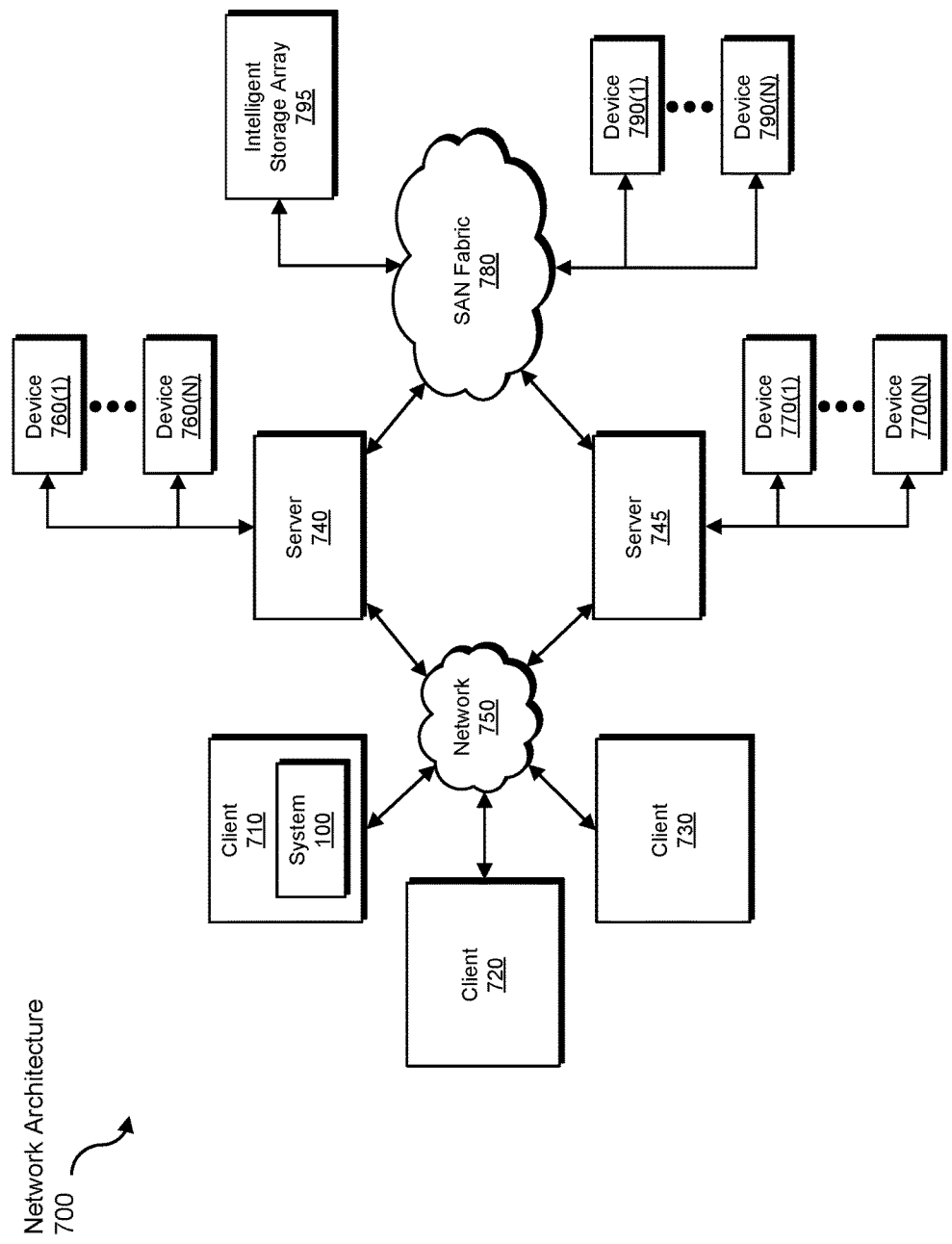
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for authenticating users on touchscreen devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive input data to be transformed, transform the input data by mirroring it, output a result of the transformation to an authentication data comparison module, use the result of the transformation to determine whether the input data is a mirrored version of valid authentication data, and store the result of the transformation to a temporary variable. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for authenticating users on touchscreen devices, at least a portion of the method being performed by a computing device comprising at least one processor, the method comprising:
    detecting that the computing device is at an authentication step that requires valid authentication input from a user of the computing device in order to authenticate the user to a service on the computing device, wherein the computing device has a single touchscreen comprising a numerical keypad;
    detecting that the computing device is physically oriented such that the touchscreen of the computing device is facing away from the user and facing downwards towards a surface relative to the user;
    receiving input from the user via the touchscreen when the touchscreen is facing downwards towards the surface relative to the user;
    determining that the input from the user comprises a mirrored version of the valid authentication input that is flipped along a vertical axis relative to the touchscreen; and
    authenticating the user to the service in response to determining that the input was received from the user while the touchscreen was facing away from the user and downwards towards the surface relative to the user and determining that the input comprises the mirrored version of the valid authentication input.

2. The computer-implemented method of claim 1, wherein authenticating the user to the service on the computing device comprises unlocking the computing device.

3. The computer-implemented method of claim 1, wherein determining that the input comprises a mirrored version of the valid authentication input comprises:
    determining that the valid authentication input comprises a plurality of ordered components; and
    determining, for each ordered component within the plurality of ordered components, that a currently entered component of the input from the user comprises a mirrored version of the ordered component that corresponds to a correct position in the plurality of ordered components.

4. The computer-implemented method of claim 1, wherein receiving the input from the user via the touchscreen comprises:
    detecting that the user has entered a component of the input; and
    providing the user with an acknowledgement that the component of the input has been received by the computing device.

5. The computer-implemented method of claim 4, wherein providing the user with the acknowledgement comprises vibrating the computing device.

6. The computer-implemented method of claim 1, wherein detecting that the computing device is at the authentication step comprises receiving input from the user that triggers the authentication step.

7. The computer-implemented method of claim 1, wherein detecting that the computing device is physically oriented such that the touchscreen of the computing device is facing away from the user of the computing device comprises using an accelerometer within the computing device to determine a physical orientation of the computing device.

8. The computer-implemented method of claim 1, wherein the computing device comprises a mobile device.

9. The computer-implemented method of claim 1, wherein the valid authentication input comprises a series of shapes drawn on the touchscreen.

10. The computer-implemented method of claim 1, wherein the valid authentication input comprises a series of presses at a series of points on the touchscreen.

11. A system for authenticating users on touchscreen devices, the system comprising:
    a detection module, stored in memory, that:
        detects that a computing device is at an authentication step that requires valid authentication input from a user of the computing device in order to authenticate the user to a service on the computing device, wherein the computing device has a single touchscreen comprising a numerical keypad; and detects that the computing device is physically oriented such that the touchscreen of the computing device is facing away from the user and is facing downwards towards a surface relative to the user;

a receiving module, stored in memory, that receives input from the user via the touchscreen when the touchscreen is facing downwards towards the surface relative to the user;

a determination module, stored in memory, that determines that the input from the user comprises a mirrored version of the valid authentication input that is flipped along a vertical axis relative to the touchscreen;

an authentication module, stored in memory, that authenticates the user to the service in response to determining that the input was received from the user while the touchscreen was facing away from the user and downwards towards the surface relative to the user and determining that the input comprises the mirrored version of the valid authentication input; and at least one physical processor configured to execute the detection module, the receiving module, the determination module, and the authentication module.

12. The system of claim 11, wherein the authentication module authenticates the user to the service on the computing device by unlocking the computing device.

13. The system of claim 11, wherein the determination module determines that the input comprises a mirrored version of the valid authentication input by:

determining that the valid authentication input comprises a plurality of ordered components; and determining, for each ordered component within the plurality of ordered components, that a currently entered component of the input from the user comprises a mirrored version of the ordered component that corresponds to a correct position in the plurality of ordered components.

14. The system of claim 11, wherein the receiving module receives the input from the user via the touchscreen by:

detecting that the user has entered a component of the input; and providing the user with an acknowledgement that the component of the input has been received by the computing device.

15. The system of claim 14, wherein the receiving module provides the user with the acknowledgement by vibrating the computing device.

16. The system of claim 11, wherein the detection module detects that the computing device is at the authentication step by receiving input from the user that triggers the authentication step.

17. The system of claim 11, wherein the detection module detects that the computing device is physically oriented such that the touchscreen of the computing device is facing away from the user of the computing device by using an accelerometer within the computing device to determine a physical orientation of the computing device.

18. The system of claim 11, wherein the computing device comprises a mobile device.

19. The system of claim 11, wherein the valid authentication input comprises a series of shapes drawn on the touchscreen.

20. A non-transitory computer-readable medium comprising one or more computer-readable instructions that, when executed by at least one processor of a computing device, cause the computing device to:

detect that the computing device is at an authentication step that requires valid authentication input from a user of the computing device in order to authenticate the user to a service on the computing device, wherein the computing device has a single touchscreen comprising a numerical keypad;

detect that the computing device is physically oriented such that the touchscreen of the computing device is facing away from the user and is facing downwards towards a surface relative to the user;

receive input from the user via the touchscreen when the touchscreen is facing downwards towards the surface relative to the user;

determine that the input from the user comprises a mirrored version of the valid authentication input that is flipped along a vertical axis relative to the touchscreen; and authenticate the user to the service in response to determining that the input was received from the user while the touchscreen was facing away from the user and downwards towards the surface relative to the user and determining that the input comprises the mirrored version of the valid authentication input.

* * * * *